March 26, 1935.  O. C. SCHMIDT  1,995,654
CARCASS DEHAIRING MACHINE
Filed Oct. 7, 1933   5 Sheets-Sheet 1
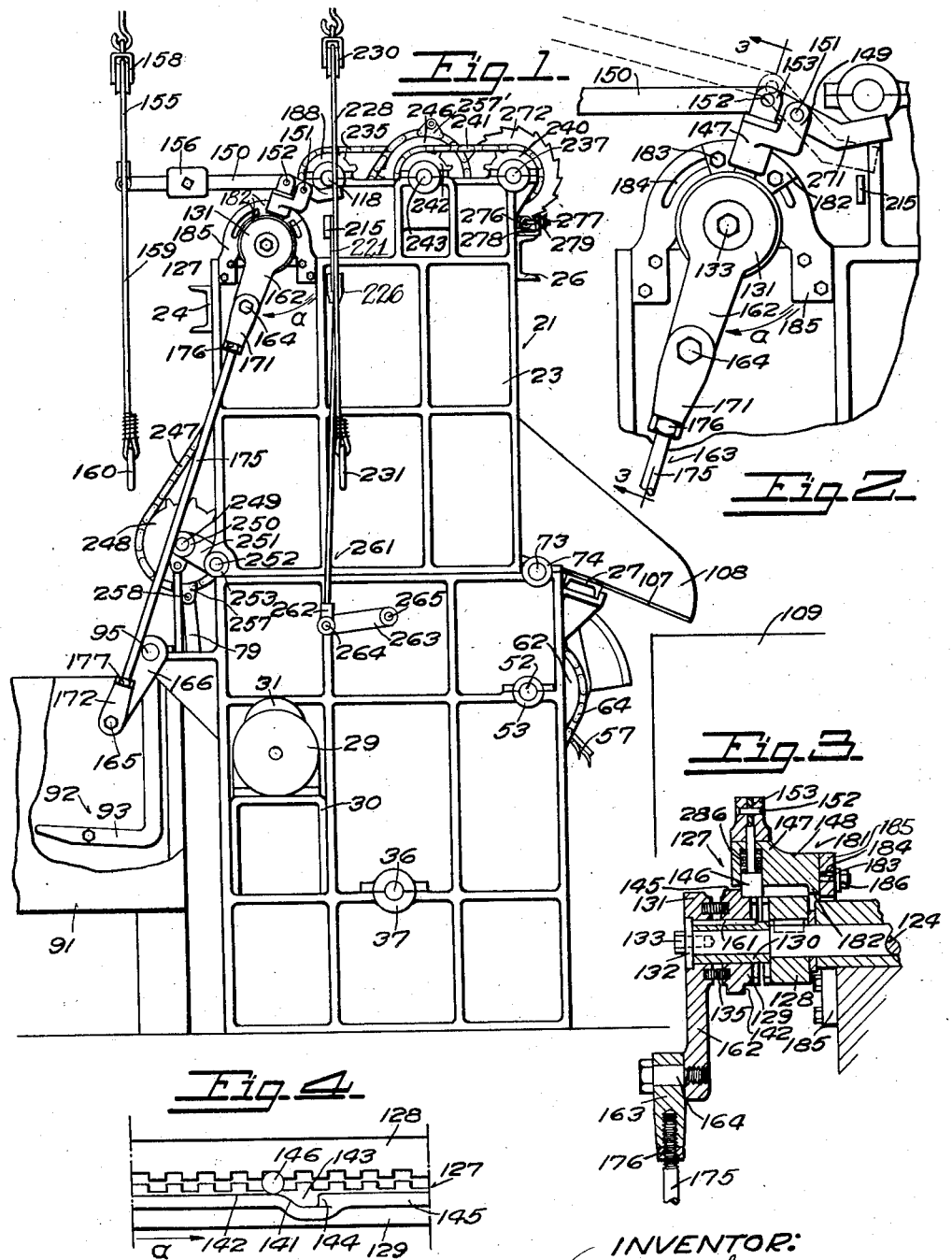
INVENTOR:
Oscar C. Schmidt,
His Attorney

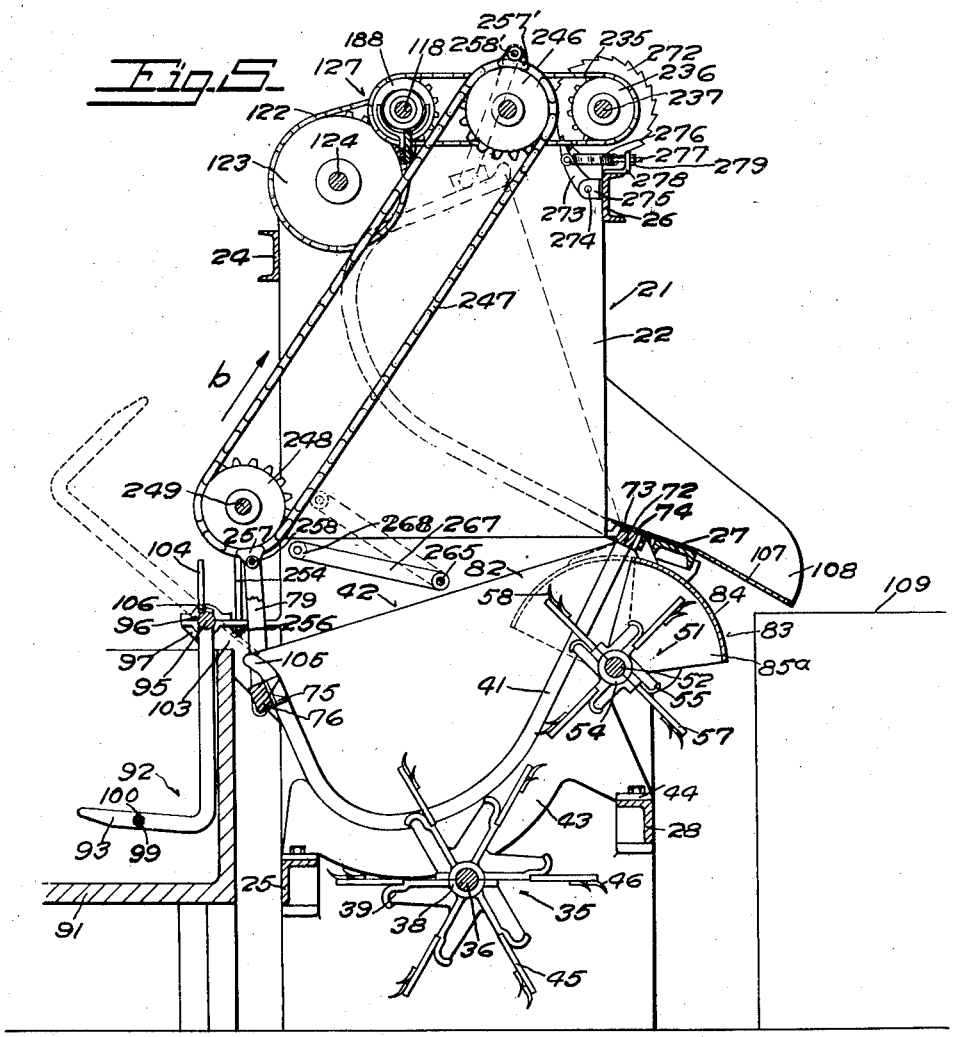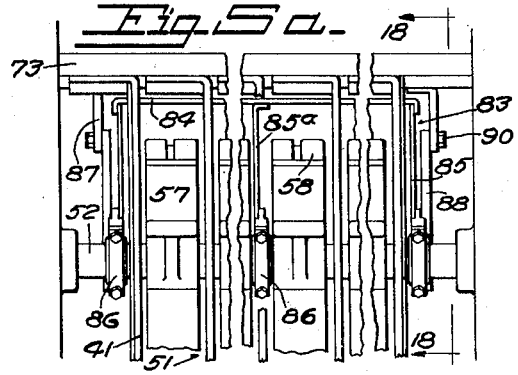

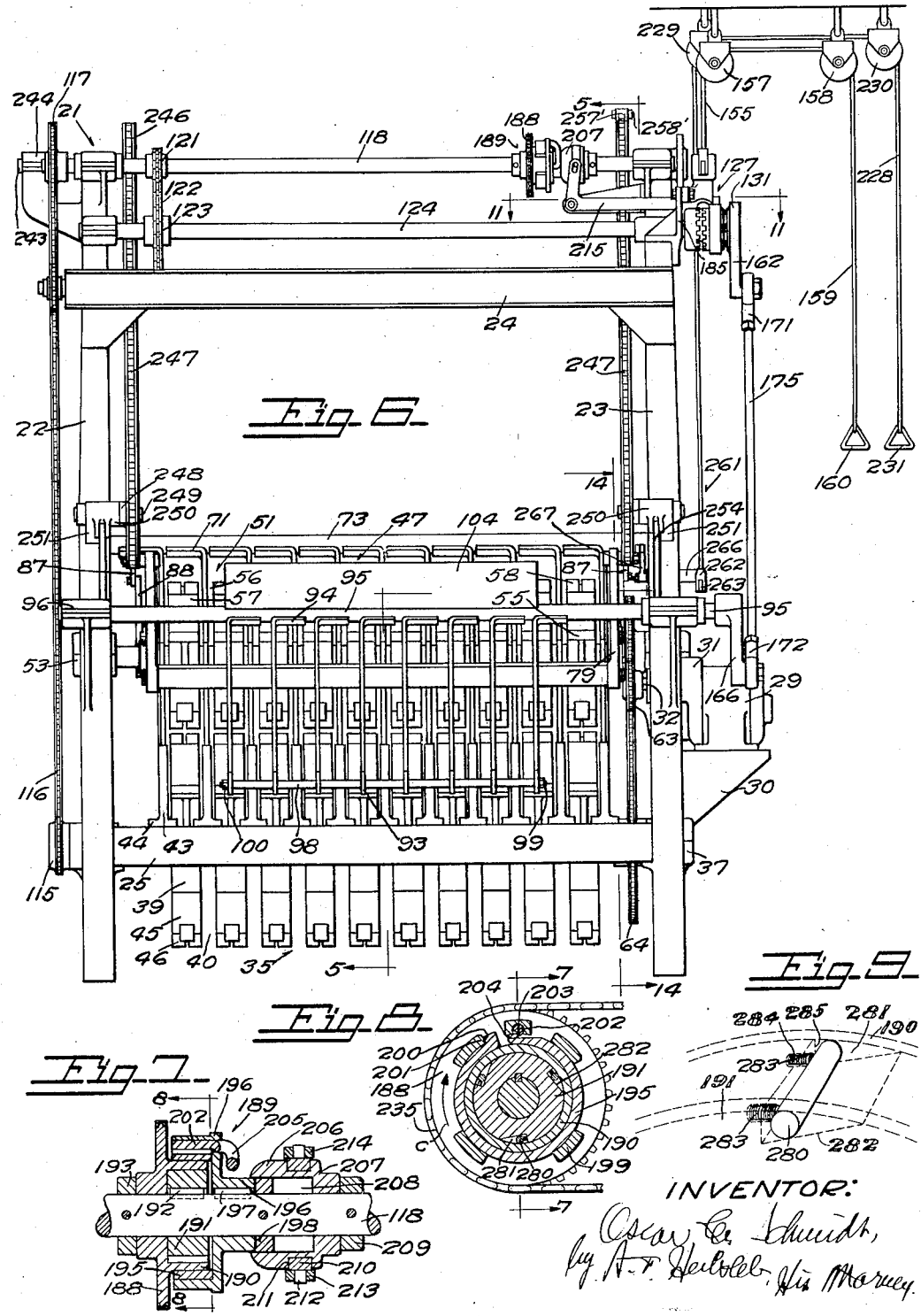

March 26, 1935.  O. C. SCHMIDT  1,995,654
CARCASS DEHAIRING MACHINE
Filed Oct. 7, 1933   5 Sheets-Sheet 4

INVENTOR:
Oscar C. Schmidt,
by A. H. Halsleb,
his Attorney

March 26, 1935. O. C. SCHMIDT 1,995,654
CARCASS-DEHAIRING MACHINE
Filed Oct. 7, 1933 5 Sheets-Sheet 5
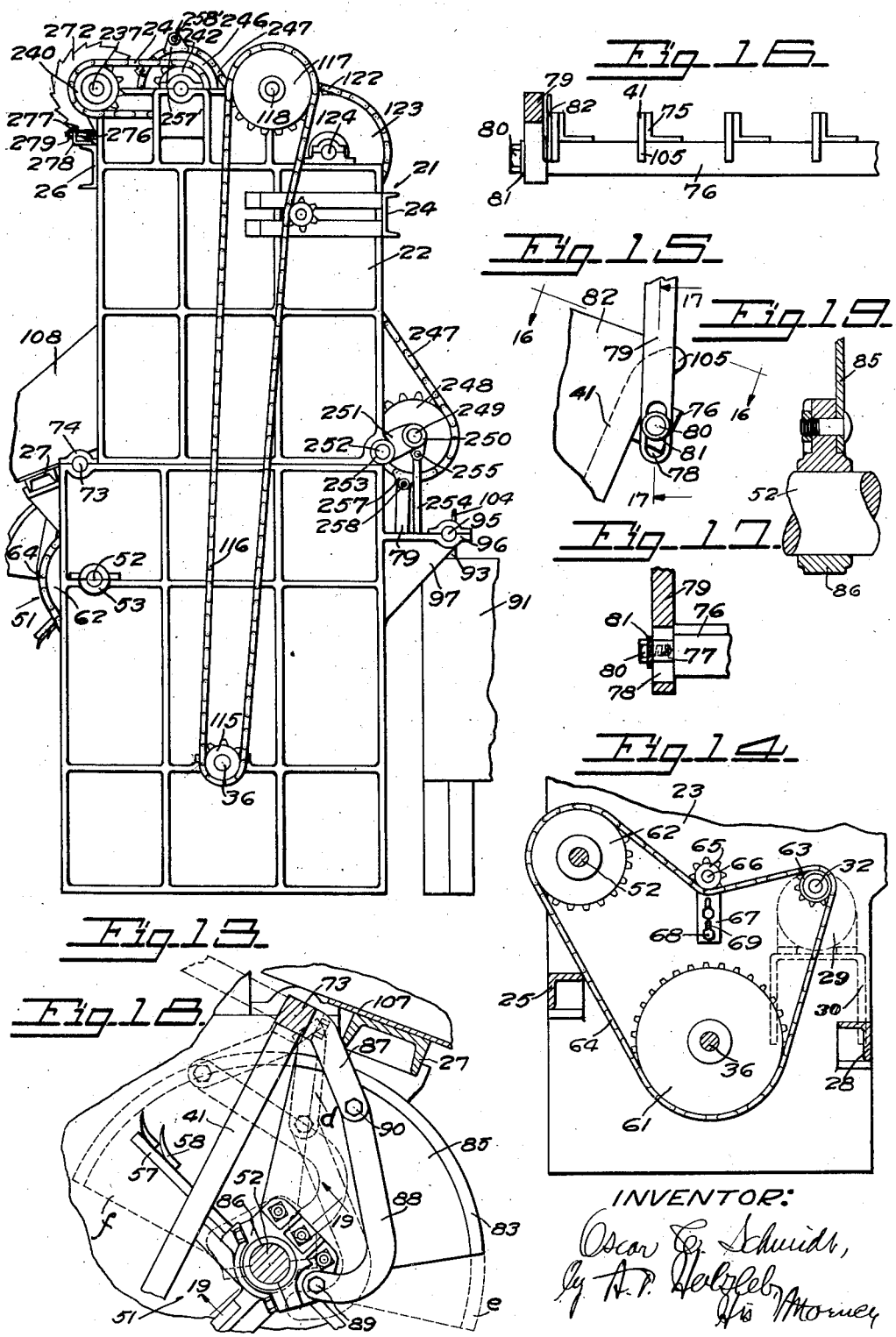
INVENTOR:
Oscar C. Schmidt,
by A. P. Helfeb
his Attorney Patented Mar. 26, 1935

1,995,654

UNITED STATES PATENT OFFICE 1,995,654

CARCASS-DEHAIRING MACHINE

Oscar C. Schmidt, Cincinnati, Ohio, assignor to The Cincinnati Butchers' Supply Company, Cincinnati, Ohio, a corporation of Ohio Application October 7, 1933, Serial No. 692,686

20 Claims. (Cl. 17—16)

It is the object of my invention to provide a novel arrangement of grate to contain the carcass, and dehairing rotors acting upon the carcass, the lower rotor acting to urge the carcass upwardly toward a higher rotor located above and laterally with relation to the lower rotor, said rotors provided with scraping elements reaching through the grate for contacting the carcass, the upper rotor acting with an inward scraping movement upon the carcass, whereby to tumble the carcass between the rotors and in the grate, to subject all portions of the surface of the carcass to the action of the scrapers on the rotors, and to dehair the carcass in a very short interval of time.

My invention consists in novel means for accomplishing this purpose; further, in providing a novel throw-in mechanism comprising tilting means, whereby the carcass is raised and caused to slide into the dehairer grate over an intermediate support between the tilting throw-in grate or scoop and the dehairer grate, which is also arranged to be tilted, the intervening support being so arranged as to permit the latter tilting; further, in providing novel carcass charging means for a dehairing trough and novel carcass discharging means for discharging the carcass from said trough, and novel operating means therefor so interlocked that only one of the means for controlling the position of the carcass with relation to the trough is operable at one time; and, further, in providing clutches for said respective operating means and operating means for said respective clutches having obstructing parts arranged to be placed in obstructing relation with each other upon actuation of either of said last-named operating means.

My invention consists further in providing novel means for tilting the dehairer trough in association with novel means for preventing accidental retracting movement of the same; further, in providing novel means for preventing overrunning of the same; and further in providing novel shielding means for the carcass.

The invention will be further readily understood from the following description and claims, and from the drawings, in which latter:

Fig. 1 is an end elevation of my improved device, partly broken away.

Fig. 2 is an enlarged side elevation of a detail of the clutch interlocking means, and showing the control lever for the clutch of the carcass throw-in for disengaged relation of the clutch in full lines, and for connected relation of the clutch in dotted lines.

Fig. 3 is a cross-section of the same, taken on the line 3—3 of Fig. 2.

Fig. 4 is a diagrammatic view of the clutch for the carcass throw-in, shown in development, and showing the clutch in disengaged relation.

Fig. 5 is a vertical cross-section of my improved device, partly broken away, and taken in the plane of the irregular line 5—5 of Fig. 6, and showing the actuating lever for automatic return of the trough control clutch in position for normal or disengaged position of the clutch in full lines and for engaged relation of the clutch in dotted lines, and further showing the throw-in grate and its associated bridge for the gap between it and the dehairer grate in normal position in full lines, and the tilted relation of the throw-in grate in dotted lines; and, further, showing the normal positions of the dehairing trough and the protecting shield in full lines and its tilted positions in dotted lines.

Fig. 5a is a front elevational detail view of the protecting shield, partly broken away.

Fig. 6 is a front elevation of my improved device.

Fig. 7 is an axial section of the clutch for the dehairing trough, taken in the plane of the line 7—7 of Fig. 8.

Fig. 8 is a cross-section of the same, taken in the plane of the line 8—8 of Fig. 7.

Fig. 9 is a perspective phantom view of a detail of the same, showing the control to prevent overrun during return of the trough.

Figure 10:
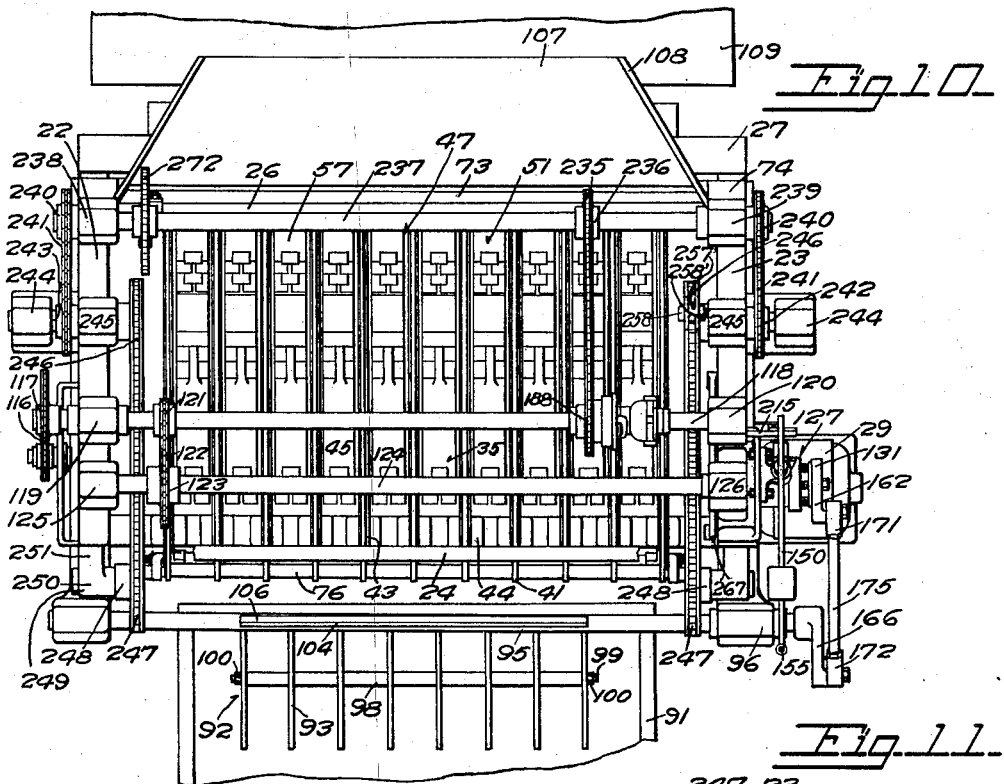

Fig. 10 is a plan view of my improved device, partly broken away.

Figure 11:
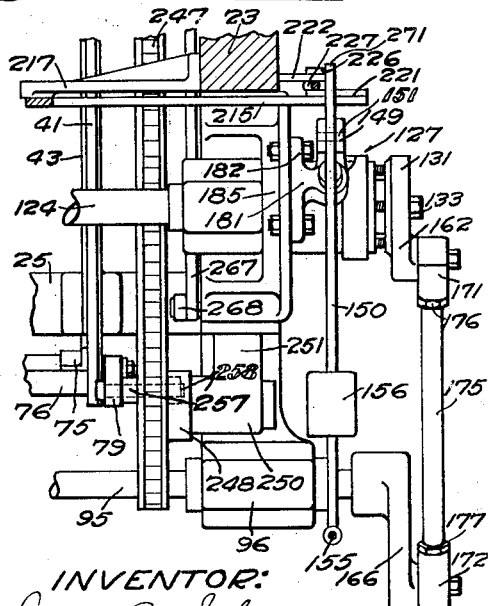

Fig. 11 is an enlarged plan view of one corner of the same, partly in section on the line 11—11 of Fig. 6.

Figure 12:
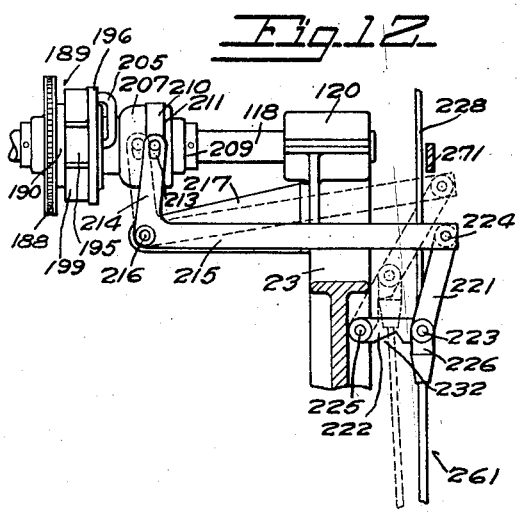

Fig. 12 is an enlarged side elevation of the clutch for operation of the dehairing trough and its associated mechanism, showing the clutch lever in normal position in full lines for disengagement of the clutch, and in actuated position for engagement in the clutch in dotted lines.

Fig. 13 is a rear side elevation of my improved device, partly broken away.

Fig. 14 is a vertical cross-section of a detail of the driving means, taken on the line 14—14 of Fig. 6.

Fig. 15 is an end detail view of the swinging end of the grate, partly broken away.

Fig. 16 is a plan view of the same, partly in horizontal section on the line 16—16 of Fig. 15, and partly broken away.

Fig. 17 is a vertical section of the same, taken on the line 17—17 of Fig. 15.

Fig. 18 is a cross-section, taken on the line 18—18 of Fig. 5a, showing the shield and its actuating means in normal position in full lines and in assumed position in dotted lines; and Fig. 19 is a sectional detail view of the same, taken on the line 19—19 of Fig. 18.

The frame 21 of the machine comprises end walls 22, 23, of ribbed cast iron, and metal cross beams 24, 25, 26, 27 and 28, rigidly fixed thereto (Figs. 1, 5, 6 and 13). An electric motor 29 is fixed to a bracket 30 on a frame, the rotor of which actuates suitable gearing in a speed reducing gear box 31, secured to motor frame, and having a driven shaft 32 (Fig. 14).

A scraping rotor 35 has a shaft 36, which is journaled in bearings 37 in the end walls of the frame (Figs. 1, 5, 6, 10, 13 and 14). The rotor comprises central hubs 38, having arms 39, and suitably fixed in endwise spaced relation to the shaft 36 for forming spaces 40, in which bars 41 of a dehairing grate 42 are received. Supporting braces 43 are also received in these spaces, forming supports on which the grate bars normally rest. These braces are provided with flanges 44 at their respective ends, fixed as by suitable bolts, to the cross-girders 25, 28.

The arms 39 have the inner ends of flexible arms 45 fixed thereto, which flexible arms may be of leather or rubber belting, and have scraper blades 46 fixed to their outer ends, the flexible arms being resilient arms, and are arranged to be flexed downwardly by contact of the scraper blades with the carcass, and to be supported by the arcuate outer ends of the arms 39. This rotor is shown as provided with six of these arms. The arms and blades operate through openings or slots 47 between the bars 41 of the grate for scraping the carcass in the grate.

A dehairing rotor 51 has a shaft 52 journaled in bearings 53 in the end walls of the frame (Figs. 5 and 6). This rotor also comprises central hubs 54, having arms 55 suitably fixed in endwise spaced relation to the shaft 52 for forming spaces 56, in which the bars 41 of the dehairing grate 42 are received. The scraper arms also operate on the carcass in the grate through the openings or slots 47 in the grate or trough.

The arms 55 have the inner ends of flexible arms 57 fixed thereto, which flexible arms may be of leather or rubber belting, and have scraper blades 58 fixed to their outer ends, the flexible arms being resilient arms, and are arranged to be flexed downwardly by contact of the scraper blades with the carcass, and to be supported by the arcuate outer ends of the arms 55. This rotor is shown as provided with four of these arms.

The shafts 36 and 52, respectively, have sprocket wheels 61, 62 fixed thereto (Fig. 14). A sprocket wheel 63 is fixed to the shaft 32. A sprocket chain 64 is received loopwise about these sprocket wheels. A tensioning sprocket pulley 65 coacts with the sprocket chain and rotates on an axle 66, mounted in a slide 67, secured to the frame in adjusted positions by means of clamp bolts 68 threaded in the frame and received through slots 69 in the slide for clamping the slide in adjusted positions to the frame.

The scraping rotors are rotated by the sprocket chain. The rotor 35 is of greater diameter than the rotor 51, and has a greater number of scraper arms than the rotor 51, for causing the scrapers thereon to contact the carcass at shorter intervals and with longer and more rapid sweeping scraping strokes than the scrapers on the rotor 51, thereby rotating the carcass and moving it upwardly along the rear stretches of the bars of the grate toward the scraping rotor 51, which is located more elevated and to one side of the position of the rotor 31.

The scraper arms of the scraping rotor 51 move into the grate and aid in rotating the carcass and in easing contact of the carcass with the upwardly inclined portion of the grate bars, and act primarily upon the upper portion of the carcass. The conjoint action of the scrapers of the respective scraping rotors cause the scraper blades to move in paths about the carcass, encompassing a substantial part of the diameter of the carcass, resulting in very effectual cleaning operations.

The grate-bars form a trough or grate 42 comprising the bars 41, which are received in the spaces between the scraper arms of the scraping rotors 35, 51, and normally rest on the rigidly positioned braces 43, located in said spaces when the trough is in lowered or normal working position. These bars are arranged to tilt.

The bars comprise a lower arcuate portion, a forward downwardly and inwardly sloping portion merging with one end of said arcuate portion, and a rear upwardly sloping portion merging with the other end of said arcuate portion.

The rear upper ends of the bars are bent at right-angles to the body of the bars for forming flanges 71, (Figs. 1, 5, 6, 13 and 18), which are fixed in suitable manner to a flat side 72 of a rock-shaft 73, journaled in bearings 74 on the end walls of the frame. The securing of the flanges to the rock-shaft may be obtained by means of clamping bolts, spot welding, or the like.

The forward ends of the grate bars are fixed (Figs. 5, 10, 15, and 16), in spaced-apart relations by means of angle-pieces 75 fixed in spaced-apart relation to a lifting-bar 76, the respective grate bars being fixed at their forward ends to said angle-pieces, forming a rigid structure. The lifting-bar has reduced ends 77 received through slots 78 in lifting links 79 (Figs. 5, 15, 16 and 17). Bolts 80 pass through said slots and are threaded in the respective ends of the lifting bar for forming pivotal connections between the respective ends of the lifting bar and the lifter arms or links, washers 81 are received between the heads of the bolts and the links.

The respective ends of the trough or grate are provided with end closing plates 82, rigidly secured, as by bolts, screws or spot welding, to the respective end ones of the grate bars for confining the carcass endwise within the trough or grate.

Means are provided for shielding the carcass during its discharge from the grate, and to prevent injury to the extremities of the carcass during such discharge (Figs. 5, 5a, 18 and 19). A shield 83 is received about the rotary dehairer proximate to the pivotal axis of the grate, and is arranged to move into the normal position of the grate about the rotary dehairer as the grate is tilted upwardly to discharge the carcass.

The shield 83 exemplified comprises a curved plate 84, in the form of a sector of a cylinder. End plates 85 and an intermediate plate 85a extend rigidly inwardly from the arcuate plate, and have bearings 86 at their inner ends respectively, which are journaled about the axis of the dehairer shaft 52. The intermediate plate 85a and its bearing are located in one of the spaces between neighboring dehairer hubs and blades (Fig. 5a).

An arm 87 is fixed to the rock-shaft 73 (Figs. 5a and 6). A link 88 is pivoted on a bolt 89 on the bearing 86, and is pivoted to the arm 87 by a bolt 90. There is one of these actuating devices at each end of the shield.

The shield is in retracted position, as see the shield in full lines in Figs. 5 and 18, while the grate is in down position and the carcass is being dehaired. When upward tilting movement of the grate begins to discharge the carcass, the rock-shaft 73 is rocked to move the arms 87 downwardly, from the full-line position shown in Fig. 18 to the dotted line position d in said figure, in which relation the axes of the rock-shaft 73 and the pivots 89, 90 are in a right line, the shield being thereby further retracted from the grate, as see the dotted line position e of said shield.

Continuing discharging upward tilting of the grate, causes the arm 87 to swing upwardly, thereby rocking the bearings 86 about their axes and swinging the shield 83 into the normal position of the grate about the rotary dehairer 51, as shown in dotted position f in Fig. 18, for moving legs or other parts of the carcasses which may extend through the grate, away from the rotary dehairer and back into the grate, to prevent damage to and breakage of carcass parts, and aiding in ready discharge of the carcass.

A scalding tank 91 is provided in which the hog carcass is scalded for loosening the bristles, hair and scurf thereon.

The carcass is lifted out of the scalding tank into the dehairing grate by means of a throw-in 92, shown as a cradle which comprises bars 93, bent to form a carcass rest (Figs. 1, 5, 6, 10 and 13). The bars are spaced apart, their upper ends being bent at right-angles to the body of the bar to form flanges 94, which are fixed, as by means of bolts, riveting, or spot welding, or the like, to a rock-shaft 95, journaled in bearings 96, in brackets 97, extending from the end walls of the frame. The outer ends of the bars are spaced apart by means of collars 98 between said bars, a tie-rod 99 being received through holes in said bars and through the collars, for clamping the parts together in rigid relation by means of clamping nuts 100, threaded to the respective threaded ends of the tie-rod.

The rock-shaft 95 is arranged to be tilted for moving the carcass cradle from a position in the scalding tank, in which it is arranged to readily have a carcass floated above its carcass rest, and the rock-shaft and cradle are arranged to be rocked for moving the cradle upwardly into upwardly slanting position, in which position the carcass is arranged to slide off the cradle into the dehairing grate.

There is normally a gap 103 between the rock-shaft 95 and the forward ends of the grate bars when the grate is in lowered or normal position (Figs. 5, 6, 10 and 13). A spanning plate 104 is arranged to close this gap while the carcass is being shifted from the cradle to the grate. The inner margin of this spanning plate is arranged to coact with the outer ends of the grate bars, being received above the same. These outer ends are cut away or curved, as shown at 105, to avoid contact of the carcass with said ends for preventing injury to the carcass.

The desired location of the inner margin of the spanning plate would normally interfere with the tilting movement of the outer end of the grate bars. It is therefore preferred to mount this spanning plate movably, so as to be out of the way of the grate bars when the grate is tilted for discharging the carcass. The spanning plate is preferably mounted so as to move with the rock-shaft 95, and is shown fixed to said rock-shaft in substantially the plane of the inner end of the cradle, and forms a movable extension of said cradle. The outer margin of the spanning plate is formed as a flange 106 fixed to the rock-shaft 95.

The grate 42 is preferably tilted when it is desired to discharge a carcass therefrom, as by rocking it and its rock-shaft 73 about the axis of the rock-shaft, for sloping the rear portion of the grate downwardly and rearwardly, for discharging the carcass by gravity upon a discharge apron 107, fixed to the cross-girder 27, and having end walls 108, which slope rearwardly toward each other for guiding the carcass on to a gambreling table 109.

The shaft 36 has a sprocket pinion 115 fixed thereto, (Figs. 6, 10 and 13), about which a sprocket chain 116 is received for driving the same, the other end of the loop of the sprocket chain being received about a sprocket pulley 117, fixed to a cross-shaft 118, journaled in bearings 119 and 120 on the frame.

A sprocket pinion 121 is fixed to the shaft 118, (Figs. 5, 6 and 10), a sprocket chain 122 being received thereabout and about a sprocket pulley 123 fixed to a cross-shaft 124, journaled in bearings 125, 126 on the frame.

A tooth clutch 127 has a clutch member 128 secured to said shaft, (Figs. 2, 3, 4, 6, 10 and 11), and a clutch member 129 normally non-rotative about said shaft, (Fig. 3), and located on a sleeve 130, on which a hub 131 is also located, said sleeve and said hub held endwise to said shaft by a washer 132 secured to the end of the shaft by a bolt 133.

Springs 135 are located between the clutch member 129 and the hub 131 for urging clutch engagement, the springs being located in sockets respectively in the hub and clutch member. The clutch member 129 comprises a cam face 141 (Fig. 4) and an end abutment face 142, the cam face forming one wall of peripheral recess 143 in the clutch member, the recess also having an end wall 144. The clutch collar has a peripheral riding face 145.

A control pin 146 is axially movable in a bearing 147, of a bracket 148, extending from the frame, and having a pivot lug 149 thereon (Figs. 2, 3 and 11). A lever 150 is pivoted on a pivot pin 151 in the pivot lug, and is provided with an articulating pin 152 connecting said lever with a fork 153 at the upper end of the pin. A flexible connection 155, as a cable, (Figs. 1, 6 and 10), has connection with the outer end of this lever, which preferably has a weight 156 adjustable thereon for normally causing depression of the clutch pin.

The cable is received about pulleys 157, 158, suitably secured to an upper structure, as the ceiling of a room, and has a depending end 159, having an operating handle 160. Pulling downwardly on the operating handle raises the clutch end of the lever, which in turn moves the obstructing pin out of obstructing relation with the clutch member 129, thereby causing the springs 135 to move said clutch member into engagement with its coacting clutch member 128, and causing rotation of the outer hub 131 with the shaft. The hub and endwise movable clutch-member are held rotatively to the sleeve 130 by a key 161.

This hub 131 has a crank arm 162 thereon, to which a pitman rod 163 is articulated, as by a crank connection 164 (Figs. 1, 2, 3, 6 and 11). The other end of the link has crank connection 165 with a rocker-arm 166 fixed to the rock-shaft 95 carrying the throw-in cradle. The pitman-rod comprises end parts 171, 172, in threaded holes in which the threaded ends of a rod 175 are adjustingly received, and locked in adjusted positions by jam-nuts 176, 177, for adjusting the length of the pitman-rod.

When the clutch is engaged, rotation of the crank-arm 162 is caused for rotating the same in the direction of the arrow a. This causes raising of the crank-arm 166 and upward tilting of the cradle, until the cradle is moved into up position, as shown in dotted lines in Fig. 5, for causing sliding of the carcass out of the cradle across the spanning plate 104 and into the dehairing cradle. By this time the crank-arm 162 will have completed one-half its revolution for completing the upward movement of the crank-arm 166, which latter moves less than a half revolution.

The latter crank-arm begins to descend after the crank-arm 162 has completed a half revolution, and by the time the crank-arm 162 will have completed an entire revolution, the cradle will again be in down position in the scalding tank 91. Just prior to completion of a single revolution of crank-arm 162, the end wall 144 of the recess 143 (Fig. 4) will have reached the control pin 146, for causing dropping of the control pin into said recess, the handle 160 having in the meantime been released by the operator, and the cam-face 141 will engage the pin 146, climbing upon said pin and moving the clutch member 129 outwardly away from its coacting clutch member 128 fixed to the shaft, and disengaging the clutch, and thereby causing cessation of movements of the crank-arms, pitman-rod and cradle.

The bearing 147 has flanges 182, forming an adjustable piece which is shiftable about the axis of the shaft 124 (Figs. 2, 3 and 11), for correctly locating the control pin in order to correctly time the actuation of the throw-in cradle. Clamp bolts 183 are received through an arcuate slot 184 in a plate 185 secured to the frame and through holes in the flanges 182, clamp nuts 186 clamping said parts in adjusted positions.

A sprocket wheel 188 is journaled loosely about the shaft 118 (Figs. 5, 6 and 10), and is arranged to be temporarily secured to said shaft by means of a clutch 189, for causing tilting movement of the dehairing grate up and down for discharging the cleaned carcass and returning the grate to normal position.

The sprocket wheel 188 is provided with an annular flange 190, (Figs. 7, 8 and 12), received about a hub 191, fixed to the shaft, as by a key 192, about which the flange rotates idly. The hub prevents endwise movement of the sprocket wheel in one direction, its movement in the opposite direction being prevented by a collar 193 secured to the shaft.

A friction band 195 is received about the flange 190. A clutch member 196 is fixed to the shaft, as by a key 197. A collar 198 pinned to said shaft prevents endwise movement of the clutch member 196 and of the hub 191 in one direction, the movements of these parts in the opposite direction being limited by the collar 193.

The clutch member 196 is provided with circumferentially extending flanges 199, located about the friction band. One end of the friction band is provided with a shoulder 200 engaging a similar shoulder 201 on one of said flanges. A rocker-pin 202 is journaled in one of said flanges, and has a shoulder 203 thereon, which engages a shoulder 204 at the other end of the friction band. This rocker-pin has an actuating arm 205 extending therefrom, the outer end of which is arranged to be engaged by a taper end 206 of an endwise movable sleeve 207, received about said shaft and having an inner annular recess 208, in which the hub of the clutch element 196 and the collar 198 are received. A collar 209 pinned to the shaft 118 limits outward endwise movement of the sleeve 207.

An actuating ring 210 is loosely journaled in an annular groove 211 in the sleeve 207, and is provided with radially extending pins 212, received in slots 213, in the branches of a fork 214, which is part of a bell-crank lever 215, pivoted on a pivot pin 216, on a bracket 217, on the frame (Fig. 12). Toggle links 221, 222, are pivoted together by a pivot pin 223. The outer end of one of the toggle links is pivoted to the outer end of the lever 215 by a pin 224, and the outer end of the other toggle link is pivoted to the frame by a pivot pin 225. Descent of the outer end of the bell crank lever 215 is limited by engagement of the sleeve 207 with the collar 209 on the shaft 118, for disengaged relation of the clutch 189.

The pivot pin 223 is sufficiently long to receive the bearings of a fork 226 thereabout, and to receive an eye 227 of a flexible connection 228, shown as a cable, secured thereto (Figs. 11 and 12). The cable extends upwardly and about pulleys 229, 230, and then downwardly, and has a handle 231 secured to its lower end (Figs. 1 and 6).

If it is desired to engage the clutch 189, the operator pulls down on the handle 231, which raises the outer end of the bell crank lever 215 for engaging the clutch. It at the same time pulls the inner pivoted ends of the toggle links inwardly so as to move the axis of the pivot 223 beyond a right line between the axes of the pivots 224 and 225, and holding the said links in such position by engagement of the wall of the lower end of the slot in the fork 226 with one of the links, which is notched as shown at 232 for accommodating the fork. (See dotted lines in Fig. 12.) This arrangement locks the clutch 189 in engaged relation. This may also be accomplished by engagement of the link 222 with a rib of the end wall of the frame.

The sprocket wheel 188 has a sprocket chain 235 received thereabout and about a sprocket wheel 236 fixed to a cross-shaft 237 journaled in bearings 238, 239 in the end walls of the frame (Figs. 1, 5 and 10). This shaft also has sprocket wheels 240, secured to its respective ends, about which sprocket chains 241 are received, the latter being also received over sprocket wheels 242, respectively fixed to shafts 243, journaled in bearings 244, 245, on the respective end frames, and have sprocket wheels 246 secured thereto. These latter sprocket wheels are separated so that the dehairer grate may have free movement between them when tilting the latter.

These latter sprocket wheels have sprocket chains 247 received thereabout and about sprocket wheels 248, respectively fixed to stub shafts 249, journaled in bearings 250 of arms 251, pivoted on stub shafts 252, fixed in bearings 253 in the respective end frames (Figs. 1, 5, 6, 10, 11 and 13). Each of the arms 251 has a link 254 pivoted thereto on a pivot pin 255. The links extend downwardly and pass through holes in flanges of the brackets 97. The lower threaded ends of these links have nuts 256 (Fig. 5) threaded thereto under said flanges for adjustably pulling down on the links and adjusting the tension of the sprocket chains 247.

The sprocket chains 247 and the sprocket wheels 246, 248 at the respective ends of the machine are separated from each other substantially the full length of the machine for permitting the dehairing grate to be swung up and down between them.

Each of the sprocket chains 247 is provided with a pivot lug 257, (Figs. 1, 5, 6, 11 and 13), to which the link 79 is pivoted by a pivot 258. The dehairing grate is at each end provided with the pivot 77 received in the slot 78, in the lower end of each of the links 79 (Figs. 15 and 17).

The pivots at the respective ends of the frame move together with the simultaneous operation of the sprocket chains, which move in the direction of the arrow b, and when they move along the upper inclined stretches of the sprocket chains 247, they act to swing the swinging end of the dehairing grate upwardly, as to the dotted position of the grate shown in Fig. 5, for discharging the carcass from the dehairing grate, the sprocket chains continuing their movements for causing the pivot lugs to descend and permitting downward swinging of the dehairing grate.

The travel of the sprocket chains is automatically stopped when the lugs 257 arrive at their normal downward positions, the slots 78 being provided so as to permit slight deviation in positions of said lugs in their down positions, when the dehairing grate has been brought to rest upon its supports.

The automatic stoppage of travel of the sprocket chains 247 is caused by a link 261, which comprises the fork 226, a fork 262, and a rod between the forks (Figs. 1, 6 and 12). The fork 262 is articulated with an arm 263 by a pivot pin 264. The rod has threaded connections with its forks for permitting adjustments of the length of the link.

The arm 263 is fixed to a rock-shaft 265, journaled in a bearing 266 in one of the end frames, an operating arm 267 extending therefrom, in the outer end of which a roller 268 is journaled (Figs. 5, 6, 10 and 11). The articulating pin 258 is extended (Fig. 11), so that when it descends it engages the roller 268, for instance, when the arm 267 is in its actuated or assumed position, as shown in dotted lines in Fig. 5, representing the extended or clutch engaging relation of the toggle links 221, 222. The pin then moves the arm 267 for collapsing locked relation of the toggle links and causing disengagement in the clutch 189, the arm 267 having in the meantime been moved to its normal position, shown in full lines in Fig. 5, and the pivot lug 257 having returned to its normal position, as shown.

The grate may be arrested in its up position, if desired, as by providing the sprocket-chain with an additional lug 257' from which a pin 258' extends to engage the roller 268.

Interlocking means are provided to prevent simultaneous engagement in both the clutches 127, 189, so as to avoid interference between movements of the throw-in cradle and the dehairing grate, and inopportune loading and discharge of the carcass (Figs. 2, 11 and 12). For this purpose the lever 150 is provided with a tail 271, said tail and the bell-crank lever 215 being placed in obstructing relations with each other when the respective levers 150, 215 are operated, and forming stops for such respective levers to prevent movements of said respective levers which would cause interfering relation in the operated mechanism.

Referring to Fig. 2, it will be observed that when the lever 150 is actuated to cause engagement in the clutch 127, the tail 271 is moved into obstructing relation with the swinging end of the lever 215, as shown by the dotted lines of the lever 150 and the tail in this figure, thus preventing actuation of the lever 215 by the operator as long as the actuating pin 146 rides upon the riding face 145 of the clutch member 129, which is throughout almost the entire rotation of said clutch member.

If, on the other hand, the lever 215 has been raised to engage the clutch 189, it is placed in obstructing relation with the tail 271, and is maintained in such position by the locked extended relation of the toggle links 221, 222 (see Figs. 11 and 12), which is also throughout almost the entire up and down tilting movement of the dehairing grate. Downward pull upon the respective handles 160, 231, is therefore ineffectual to change the control relation of the mechanism during such interfering relations.

The weight of the dehairing grate and the carcass therein when raising the grate to discharge the carcass is considerable. In order to prevent accidental return movement of the dehairing grate toward normal position while being raised, the shaft 237 has a ratchet wheel 272 fixed thereto (Figs. 1, 5, 10 and 13), with the teeth of which a pawl 273 engages to prevent retraction of the ratchet wheel and its shaft, and consequently retraction of the sprocket chains 247, and accidental retraction of the dehairing grate while being raised.

The pawl is pivoted on a pin 274 (Fig. 5) in a fork 275, fixed to the cross-bar 26, and is held toward the sprocket wheel by a spring 276, one end of which is secured to the pawl and the other end of which is retained by an adjusting screw 277, passing through a hole in a lug 278, fixed to said cross bar 26, a nut 279 being threaded thereon for adjusting the tension of the spring.

Undue speed of descent and dropping of the dehairing grate during return or descent of the same to normal position, due to slippage in the clutch 189, is avoided by the provision of an automatic clutch between the operating shaft of the clutch 189 and the flange of the sprocket wheel 188 (Figs. 7, 8 and 9). This safety means is shown as rollers 280, received in recesses 281, in the hub 191. The inner walls 282 of said recesses slope outwardly toward the inner periphery of the flange 190 of the clutch 189, for tapering said recesses outwardly.

Springs 283 situated in holes 284 in the end walls 285 of said recesses normally urge said rollers toward the reduced ends of said recesses for engagement between the annular flange of said sprocket wheel and said hub. Said hub normally rotates in the direction of the arrow c, which normally urges said rollers towards the wide ends of said recesses when the friction band is engaged. The sprocket wheel and its flange are rotated in the same direction.

If, however, there should be a too rapid rotation of the sprocket-wheel and its flange, due to a too rapid descent of the dehairing grate, the sprocket wheel and its flange will overrun the speed of the hub and thereby cause locking between said flange, the rollers and the hub, for compelling the dehairing grate to descend at normal speed determined by the speed of the shaft 118.

In the operation of my improved device, the hog carcass is scalded in the scalding tank 91, and when scalded is floated above elevating cradle 92, whereupon the operator holds the handle 160 downwardly, which raises the obstructing pin 146 out of engagement with the end wall of the clutch member 129, for engagement in the clutch 127. The crank arm 162 is thereby rotated through a single revolution, and through its connection with the crank arm 166, by means of the link 175, causes rocking of said last-named crank arm about its axis for upward swinging movement of the cradle from its normal position shown in full lines to its upper position, shown in dotted lines in Fig. 5, for depositing the carcass in the dehairing grate 42 and again returning the cradle to normal position.

During charging movement of the carcass it is caused to slide over the bridging plate 104, which bridges the gap between the cradle and the dehairing grate.

The clutch 127 is maintained in engaged relation throughout substantially one revolution thereof, by the riding of the actuating pin 146 upon the outer periphery or riding face 145 of the clutch member 129, so that the operator may at once release the handle 160 after said clutch is engaged, and no change in operative effect is obtained if the operator should again inadvertently pull down on this handle. Upon initiating of engaged relation in the clutch, an obstructing stop, shown as the tail piece 271 is placed in the way of the lever 215, so that the operator cannot effect a change in operative relation or engagement of the clutch 189 by operating the handle 231.

Disengagement in the clutch 127 is automatically caused when the cradle has about reached its return to normal position by the dropping of the pin 146, urged by a spring 286, (Fig. 3), into the recess 143, for engagement with the cam face 141, whereby the clutch member 129 is moved out of engaging relation for disengaging the clutch 127.

When the carcass has been dehaired, the operator operates the handle 231 for operating the bell crank lever 215 and engaging the clutch 189, thereby placing the outer end of said bell crank lever into obstructing relation with the tail piece 271 and preventing engaging relation in the clutch 127 during engaged relation in the clutch 189.

Engaged relation in the clutch 189 causes actuation of the chains 247 at the respective ends of the dehairing grate for tilting the dehairing grate upwardly during travel of the articulating connections 258 with said sprocket chains upwardly along the upper stretch of the sprocket chains, thereby actuating the links 79, the lower ends of which are articulated with the swinging end of the dehairing grate.

The clutch 189 is maintained in its engaged relation on account of the locked relation between the toggle links 221, 222, shown in dotted lines in Fig. 12, which locked relation is maintained until automatic release thereof by the normal descent of the dehairing grate.

When the articulating connections 258 begin their descent along the lower stretches of the sprocket chains 247, the carcass will have been discharged from the dehairing grate, and the dehairing grate will be automatically returned from its uppermost or discharging position, shown in dotted lines in Fig. 5, the swinging end of the grate moving downwardly with the descent of the articulating connections 258.

When these articulating connections have neared their limit of descent, a contact part at one of these articulating connections engages the arm 267 in its assumed position, shown in dotted lines in Fig. 5, for returning said arm to its normal position, shown in full lines in said figure, for disengaging the clutch 189 by actuation of said arm, its rock-shaft, and the arm 263, said arms and rock-shaft forming a bell crank lever, and the link 261 connecting with the joined ends of the toggle links for releasing the locked engagement of said toggle links and automatically releasing the clutch 189.

Each of the clutches is maintained in engaged relation throughout its intended cycle of movement, and the other clutch is locked in disengaged relation throughout said cycle.

Accidental return of the dehairing grate during its ascent is avoided by means of the ratchet wheel 272 and its pawl 273, which prevent retracting movements of the sprocket chains 247 operating the dehairing grate.

Overrun of downward movement of the dehairing grate is avoided by the automatic clutches including the rollers 280, to prevent faster rotation of the sprocket wheel 188 than the rotation of its shaft 118.

My improved device is simple and effective in its purposes. It avoids accidents, and the relations of its dehairing rotors to the dehairing grate are such as to insure most effective dehairing of the carcass and removal of the bristles, hair and scurf thereon, and it cleans and polishes the carcasses with expenditure of little power.

Having thus fully described my invention, what I claim as new, and desire to secure by Letters Patent, is:

1. In a carcass dehairing machine, the combination of a pivoted carcass grate tiltable for discharge of the carcass, a pivoted throw-in tiltable for feeding the carcass into said grate, operating means for tilting said grate, operating means for tilting said throw-in, and control means for each of said operating means having interlocking relations one with the other.

2. In a carcass dehairing machine, the combination of a pivoted carcass grate tiltable for discharge of the carcass, a pivoted throw-in tiltable for feeding the carcass into said grate, operating means for tilting said grate, operating means for tilting said throw-in, control means for each of said operating means having interlocking relations one with the other, and means maintaining said interlocking relations during operations of said respective operating means.

3. In a carcass dehairing machine, the combination of a pivoted carcass grate tiltable for discharge of the carcass, a pivoted throw-in tiltable for feeding the carcass into said grate, operating means for said grate, operating means for said throw-in, automatic releasing means for each of said operating means, control means for each of said operating means having interlocking relations one with the other, and means maintaining said locking relations after actuation of said respective control means until actuation of said respective automatic releasing means.

4. In a carcass dehairing machine, the combination of a pivoted carcass grate tiltable for discharge of the carcass, rotary dehairing means cooperating with said grate to dehair the carcass, and power means for tilting said grate comprising a clutch and a reversely acting automatic means overcoming yield in said clutch.

5. In a carcass dehairing machine, the combination of a pivoted carcass grate tiltable for discharge of the carcass, rotary dehairing means cooperating with said grate to dehair the carcass, and power means for tilting said grate comprising a clutch and a reversely acting automatic clutch counteracting slippage in said first-named clutch.

6. In a carcass dehairing machine, the combination of a tilting grate having openings, pivot means for said grate at one side of said grate, a rotary dehairer comprising scraping arms operative through said openings to scrape the carcass in said grate, and tilting means for said grate comprising a flexible unidirectional loop having link connection with the tiltable side of said grate and inclined upwardly toward the pivoted side of said grate, and means for driving said loop whereby to cause said connection to move loopwise with said loop for first raising the tiltable side of said grate for discharging the carcass from said grate and then lowering said tiltable side to normal position.

7. In a carcass dehairing machine, the combination of a tiltable grate, pivot means for said grate at one side of said grate, a flexible unidirectional driving loop above said grate slanting upwardly toward the pivoted side of said grate, driving means for said loop, link connecting means connecting said flexible loop with the tiltable side of said grate, said link connecting means movable with said loop slantingly upward and shiftably suspended from said loop for tilting said grate for discharge of the carcass and slantingly downward for descent of said tilted grate, and automatic means disconnecting said driving means.

8. In a carcass dehairing machine, the combination of a grate provided with openings, a rotary carcass dehairer comprising scraping arms operative through said openings to scrape the carcass in said grate, pivot means for said grate at one side thereof, and tilting means for the other side of said grate comprising a pair of wheels and a flexible loop thereabout, a link having pivotal connections with said loop and the tilting side of said grate, rotating means for one of said wheels causing unidirectional travel of said loop about said wheels and of said pivotal connection between said loop and said link for tilting said grate upwardly for discharge of said carcass during upward travel of said last-named pivotal connection, and for descent of said grate to normal position during downward travel of said last-named pivotal connection, and said link being swingable from its pivotal connection with said loop for accommodating the arcuate movement of said pivotal connection of said loop with said grate during tilting of said grate, and automatic means actuated by said loop for interruption of the travel of said loop.

9. In a carcass dehairing machine, the combination of a grate having openings, a rotary dehairer having scraping arms operating through said openings to scrape the carcass in said grate, pivot means for one side of said grate, a pair of wheels and a flexible loop thereabout, operative connection beween said loop and the other side of said grate for tilting said grate upwardly for discharge of the carcass during upward travel of said operative connection, and for descent of said grate during downward travel of said operative connection, a driving member, a clutch between said driving member and one of said wheels, and means having operative connection with said wheel maintaining said wheel in actuated relation and thereby resisting descent of said grate during upward tilting movement thereof.

10. In a carcass dehairing machine, the combination of a carcass grate provided with openings, a rotary dehairer provided with scraping arms operative through said openings for scraping the carcass in said grate, pivot means for one side of said grate, tilting means for the other side of said grate comprising sprocket chain loops at the respective ends of said grate slanting upwardly toward the pivot side of said grate, sprocket wheels at the upper and lower ends of said loops, said loops having upwardly moving stretches and downwardly moving stretches, said upwardly moving stretches being farthest removed from said pivot means, a link pivoted to each of said sprocket chains, said links having pivotal conections with the tilting side of said grate at the respective ends of said grate, said links and pivot connections including spaced lifting connections for said grate, means for unidirectionally driving said sprocket chains, and tripping means for said driving means.

11. In a carcass dehairing machine, the combination of a carcass grate provided with openings, a rotary dehairer provided with scraping arms operative through said openings for scraping the carcass in said grate, pivot means for one side of said grate, tilting means for the other side of said grate comprising flexible loops at the respective ends of said grate slanting upwardly toward the pivot side of said grate, wheels at the upper and lower ends of said loops, said loops comprising upwardly moving stretches and downwardly moving stretches spaced different distances from said pivot means, pivotal connections between said respective loops and the respective ends of the tilting side of said grate, said pivotal connections including spaced lifting connections for said grate, means for unidirectionally driving said loops, tripping means for said driving means, and an actuating part therefor movable with a loop and arranged for disconnecting said driving means.

12. In a carcass dehairing machine, the combination of a pivoted grate provided with openings, a rotary dehairer comprising scraping arms operable through said openings to scrape the carcass in said grate, means whereby to tilt said grate away from said rotary dehairer to discharge the carcass, and a shield for said rotary dehairer movable about said rotary dehairer toward said grate between said grate and said rotary dehairer.

13. In a carcass dehairing machine, the combination of a pivoted grate provided with openings, a rotary dehairer comprising scraper arms operable through said openings to scrape the carcass in said grate, means whereby to tilt said grate away from said rotary dehairer to discharge the carcass, and a shield having operative connection with said grate movable about said rotary dehairer between said grate and said rotary dehairer.

14. In a carcass dehairing machine, the combination of a pivoted grate provided with openings, a rotary dehairer comprising scraper arms operable through said openings to scrape the carcass in said grate, means whereby to tilt said grate away from said rotary dehairer to discharge the carcass, and an arcuate shield movable about said rotary dehairer and having operative connection with said grate to follow the tilting discharge movement of said grate to successive positions between said rotary dehairer and said grate.

15. In a carcass dehairing machine, the combination of a grate provided with openings, pivot means for one side of said grate, a rotary dehairer comprising scraping arms operable through said openings to scrape the carcass in said grate, the outer circles of the paths of said scraper arms being adjacent to said pivot means, an arcuate shield about said rotary dehairer pivoted about the axis of rotation of said rotary dehairer, arms extending from said grate, links pivotally connecting said arms and said shield, and arranged for swinging said shield upon tilting of said grate for moving the arcuate portion of said shield to positions between said rotary dehairer and said grate.

16. In a carcass dehairing machine, the combination of a grate having openings, a rotary dehairer comprising scraping arms operative through said openings to scrape the carcass in said grate, pivot means for one side of said grate, an arcuate shield comprising an arcuate plate about the paths of said rotary scraping arms and transverse arms pivoted about the axis of rotation of said rotary dehairer, said arcuate plate normally located outside the normal position of said grate, arms extending from said grate, and links between said arms and said shield arranged to rock said shield about the operative paths of said scraping arms and across the normal position of said grate between said rotary dehairer and said grate upon upward tilting of said grate.

17. In a carcass dehairing machine, the combination of a carcass receiving trough, a scalding tank, a carcass throw-in between said scalding tank and said trough, a crank arm for said throw-in, a drive-shaft, a crank arm about the axis of said drive-shaft, a clutch between said drive-shaft and said last-named crank arm, means for controlling said clutch, a link between said crank arms, said first-named crank arm being longer than said second-named crank arm for causing reciprocation of said first-named crank arm by complete rotation of said second-named crank arm for rocking said throw-in in reverse directions, means for tripping said clutch adjacent to the end of a complete revolution of said clutch, and adjusting means for said tripping means adjusting a member of said tripping means about the axis of said clutch for adjusting the timing of said throw-in.

18. In a carcass dehairing machine, the combination of a grate having openings therein, a rotary dehairer comprising scraping arms operative through said openings for scraping the carcass in said grate, pivot means for said grate at one side thereof, and tilting means for said grate at the other side of said grate having connection with the tilting side of said grate, and driving means for said tilting means comprising a friction clutch including a driving member and a driven member, and a reversely operating clutch between said members clutching said driven member to said driving member for resisting dropping movement of said grate in excess of the speed permitted by rotation of said driving member.

19. In a carcass dehairing machine, the combination of a grate having openings, a rotary dehairer comprising scraping arms operable through said openings to scrape the carcass in said grate, pivoting means for said grate at one side of said grate, tilting means having operative connection with the other side of said grate for tilting said grate, and means for driving the latter comprising a clutch, a lever for operating said clutch, toggle links for locking said lever in actuated relation, and release means for said toggle links comprising a lever, and actuating means on said tilting means for said lever, said lever having operative connection with said toggle links for releasing the same.

20. In a carcass dehairing machine, the combination of a grate having openings, a rotary dehairer comprising scraping arms operable through said openings to scrape the carcass in said grate, pivoting means for said grate at one side of said grate, tilting means having operative connection with the other side of said grate for tilting said grate, means for driving the latter comprising a clutch, an actuating part for operating said clutch, locking means for locking said actuating part in actuated relation, a throw-in, means for operating said throw-in comprising a clutch, an actuating part for operating said last-named clutch, and locking means for locking said last-named actuating part in actuated relation, and each of said actuating parts in locked relation being in interfering relation with the other of said actuating parts.

OSCAR C. SCHMIDT.